S. A. GIEDROYC.
HYPODERMIC SYRINGE.
APPLICATION FILED OCT. 28, 1920.
1,434,381.   Patented Nov. 7, 1922.
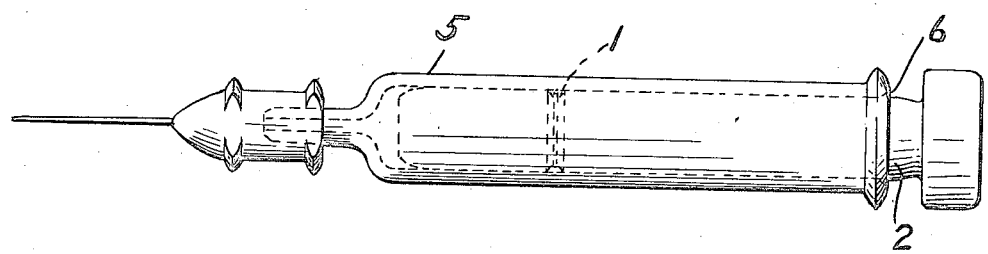
FIG. 1.
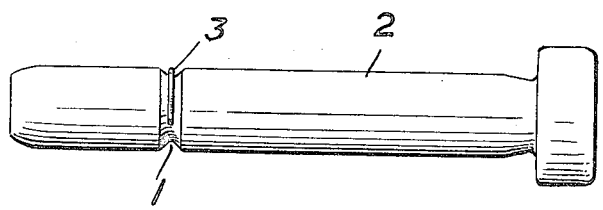
FIG. 2.
FIG. 3.
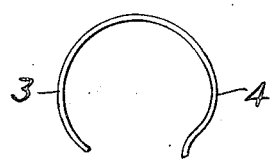     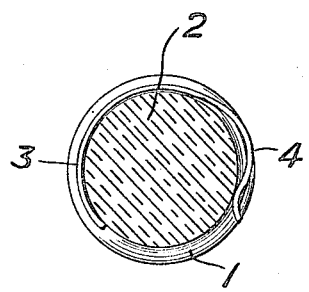
FIG. 5.     FIG. 4.
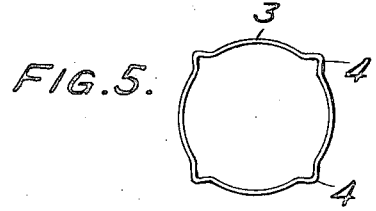
WITNESS:                            INVENTOR
Rob R Hitchel                    Sigmund A. Giedroyc
                                          BY
                               Augustus B. Stoughton.
                                          ATTORNEY Patented Nov. 7, 1922.

1,434,381

UNITED STATES PATENT OFFICE.

SIGMUND A. GIEDROYC, OF VINELAND, NEW JERSEY.

HYPODERMIC SYRINGE.

Application filed October 28, 1920. Serial No. 420,216.

*To all whom it may concern:*

Be it known that I, SIGMUND A. GIEDROYC, a citizen of the United States, residing at Vineland, in the county of Cumberland and State of New Jersey, have invented a new and useful Hypodermic Syringe, of which the following is a specification.

The principal object of the present invention is to guard against the accidental admission of air into the medicinal contents of a syringe and against the accidental spilling of its contents as well as to prevent unintentional detachment of the plunger from the cylinder. To this and other ends hereinafter set forth, the invention comprises means for preventing accidental movement of the plunger or piston towards or out of the open end of the cylinder as will be first described and finally claimed.

Reference will be made to the accompanying drawings, forming part hereof, and in which—

Figure 1, is a side view of a hypodermic syringe embodying features of the invention.

Fig. 2, is a similar view of the piston or plunger.

Fig. 3, is a view drawn to an enlarged scale showing the ring detached.

Fig. 4, is a cross sectional view of the plunger showing the ring in place, and

Fig. 5, is a view illustrating a modification of the ring.

In the drawings 1 is a groove extending around the piston or plunger 2. 3, is a ring extending at least more than half way around the plunger or piston so as to be attached thereto in such a way as not to fall off, yet the ring can be removed when desired, for example, for cleaning purposes. A part of the ring, for example the part 4, is bent away from the rest of it, or outwards, so as to bear upon the inner wall of the cylinder 5, sufficiently to prevent accidental movement of the piston or plunger towards or out of the open end 6 of the cylinder, while at the same time the movement of the plunger into the cylinder is not interfered with. The described construction is applicable to solid, hollow and other kinds of pistons, but it is well adapted to glass pistons because of the ready attachment of the ring 1, which may be made of fine platinum wire, hard rubber of other springy material which is not acted on or which does not react with the medicines employed. While the friction between the protruding part 4 of the spring ring may be so slight as to be negligible when the syringe is operated by pushing the plunger into the cylinder to expel the contents and administer the medicine, still it is sufficient to prevent the plunger or piston from falling out of the cylinder when the latter is inverted and so in some cases spilling the medicine, and sufficient to prevent the plunger from moving towards the open end of the cylinder, if the device is laid down after filling, which is advantageous because if such movement occurred, air would or might enter.

I claim:

1. In a hypodermic syringe including an open-ended cylinder and a piston the combination of a groove provided around the piston, and a ring arranged in the groove and grasping the piston and having a portion offset in the plane of the ring and from the rest of it and tending to spring beyond the cylindrical wall of the piston into frictional contact with the wall of the clinder to prevent the piston from accidentally moving towards the open end of the cylinder.

2. In a hypodermic syringe including an open-ended cylinder and a piston the combination of a groove provided in the piston, a spring ring exceeding a half circle and less than a whole circle and arranged around the groove and having a portion thereof sprung away in the plane of the ring and from the rest of it and from the bottom wall of the groove to contact with the wall of the cylinder.

SIGMUND A. GIEDROYC.